June 7, 1955 A. M. CASTELLO ET AL 2,710,103

OBJECT TURNING DEVICE

Filed Aug. 31, 1951 9 Sheets-Sheet 1

INVENTORS
Anthony M. Costello.
Lora Evans Tapp.

BY W. J. Eccleston,
ATTORNEY

INVENTOR
Anthony M. Castello.
Lora Evans Tapp.
BY W. J. Eccleston.
ATTORNEY

June 7, 1955 A. M. CASTELLO ET AL 2,710,103

OBJECT TURNING DEVICE

Filed Aug. 31, 1951 9 Sheets-Sheet 3

INVENTORS

Anthony M. Castello

Lora Evans Tapp.

BY W. J. Eccleston.

ATTORNEY

June 7, 1955 A. M. CASTELLO ET AL 2,710,103

OBJECT TURNING DEVICE

Filed Aug. 31, 1951 9 Sheets-Sheet 4

INVENTORS

*Anthony M. Castello.*

*Lora Evans Tapp.*

BY *W. J. Eccleston*

ATTORNEY

June 7, 1955 A. M. CASTELLO ET AL 2,710,103

OBJECT TURNING DEVICE

Filed Aug. 31, 1951 9 Sheets-Sheet 5

INVENTORS
Anthony M. Castello
Lora Evans Tapp.
BY W. J. Eccleston
ATTORNEY

INVENTOR
Anthony M. Castello.
Lora Evans Tupp.
BY W. J. Eccleston,
ATTORNEY

INVENTORS
Anthony M. Castello.
Lora Evans Tapp.
BY W. J. Eccleston,
ATTORNEY

INVENTORS
Anthony M. Castello.
Lora Evans Tapp
BY
W. J. Eccleston,
ATTORNEY

INVENTORS
Anthony M. Castello
and Lora Evans Tapp
BY
W. J. Eccleston
ATTORNEY

United States Patent Office 2,710,103

Patented June 7, 1955

2,710,103

OBJECT TURNING DEVICE

Anthony M. Castello, Washington, D. C., and Lora Evans Tapp, Clarksville, Ind.; Lloyt E. Tapp, Loretta Sue Tapp, Larry Wayne Tapp, and Lucille Marie Tapp, sole heirs of said Lora Evans Tapp, deceased Application August 31, 1951, Serial No. 244,682

18 Claims. (Cl. 214—1)

(Granted under Title 35, U. S. Code (1952), sec. 266)

The invention described herein, if patented, may be manufactured and used by or for the Government for governmental purposes without the payment to us of any royalty thereon.

The present invention relates to material or article handling devices and more particularly to a device for shifting polygonal shaped objects between fixed angularly spaced positions.

While the device of the present invention is susceptible to many uses, it is designed particularly for use in installations in which it is desired to have an object turning device with a mechanism capable of being fully retracted below the plane of a horizontal object supporting surface on the device when the object turning mechanism is not functioning. In the known object turning devices, the object turning mechanism commonly has parts which extend upwardly above the level of the lowermost part of the object supported upon the device. Among other disadvantages of such a device is the fact that the projecting parts of the device obstruct the line of vision to the object supported on the device, and an object is not freely movable over the object supporting surface on such a device should that be desired.

Accordingly, one object of the invention is to provide a new and improved object handling device for angularly shifting generally polygonal shaped objects between predetermined fixed positions at substantially the same locus.

Another object of the invention is to provide a new and improved object handling device which includes a fixed object supporting surface and an operating mechanism for turning objects between predetermined fixed positions that is fully retractable below the fixed object supporting surface when it is not in operation.

A further object of the invention is to provide a new and improved object turning device which can readily be adapted for successively turning an object angularly in one direction or for successively turning the object forward and backward.

A still further object of the invention is to provide a new and improved object handling device which includes operating mechanism for turning objects between predetermined angularly displaced fixed positions and manually operable controls to initiate operation of the operating mechanism so that the device operates under the complete control of an operator.

Another object of the invention is to provide a new and improved object handling device as set forth in the preceding object which includes mechanism operable while the device is turning the object in one direction to condition the same for operation in the reverse direction on the succeeding cycle thereof.

A more general object of the invention is to provide a new and improved object turning device which is relatively sturdy, compact and inexpensive in construction but which, nevertheless, is reliable in operation and not subject to rapid wear or frequent breakdown.

These and other objects, advantages and capabilities of the invention will become apparent from the following description wherein reference is had to the accompanying drawings in which, Fig. 1 is a front elevation view of the improved object handling mechanism of the present invention;

While the object turning device of the present invention is susceptible to use in many situations where it is desirable to turn objects through a predetermined angle, it is particularly adaptable for use in the device disclosed in the application for United States Letters Patent Serial No. 244,247 filed by Albert Wiebe on 29th of August 1951 and entitled "X-Ray Inspection Apparatus." Its particular adaptability for use in this apparatus arises from the fact that the operating mechanism of the object handling device discloses herein is positioned below the object supporting top of the device when this mechanism is inoperative so that it does not obstruct the view of the object when the latter is inspected fluoroscopically or radiographically. Furthermore, the device of the present invention may readily be adapted for operation in a manner successively to turn an object through a predetermined angle and then return the same to its original position or successively to turn the object through a predetermined angle without returning the object to its original position.

Figure 1:
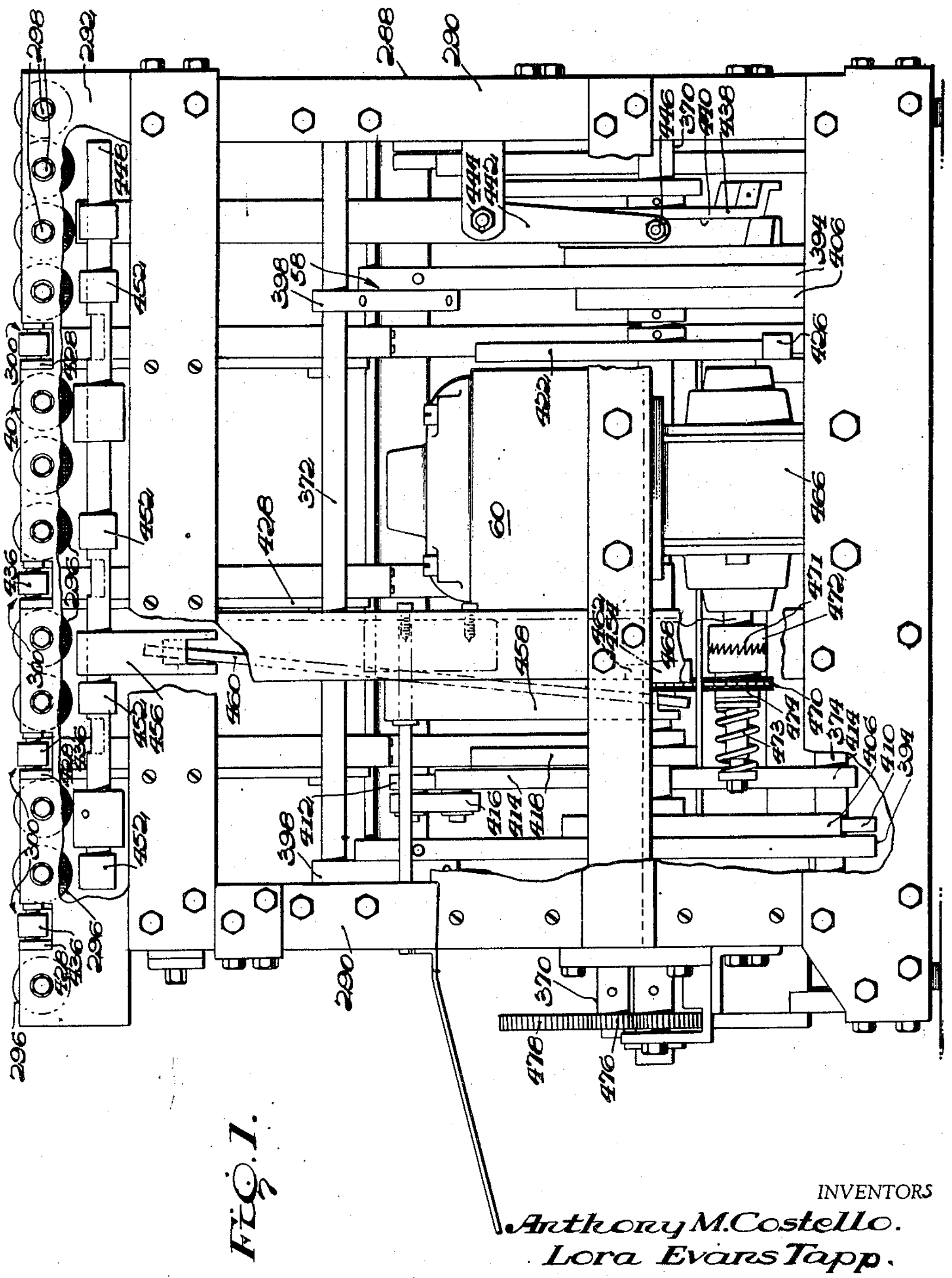
Figure 2:
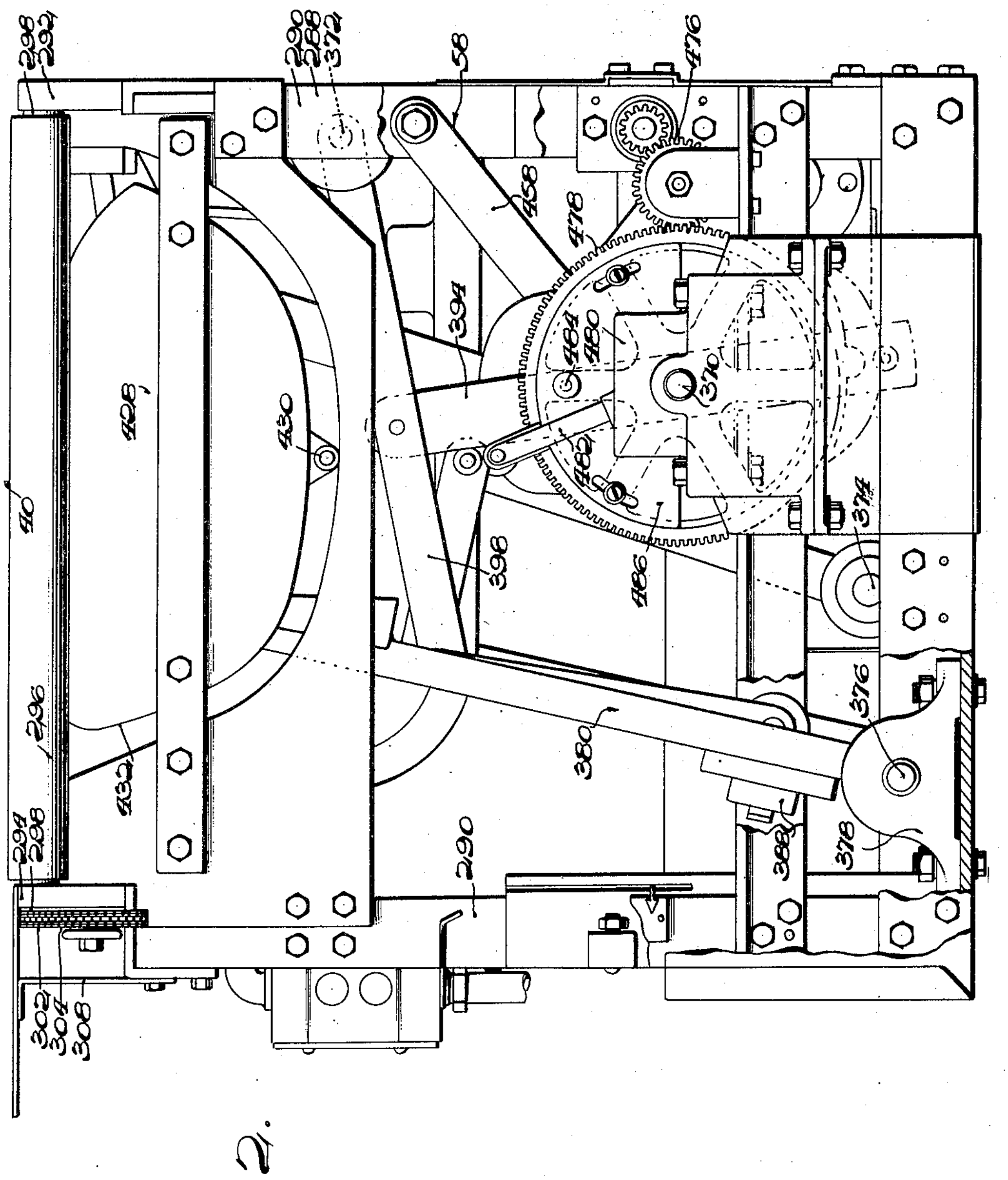
Fig. 2 is a side elevational view of the left side of the object handling device shown in Fig. 1.
Figure 3:
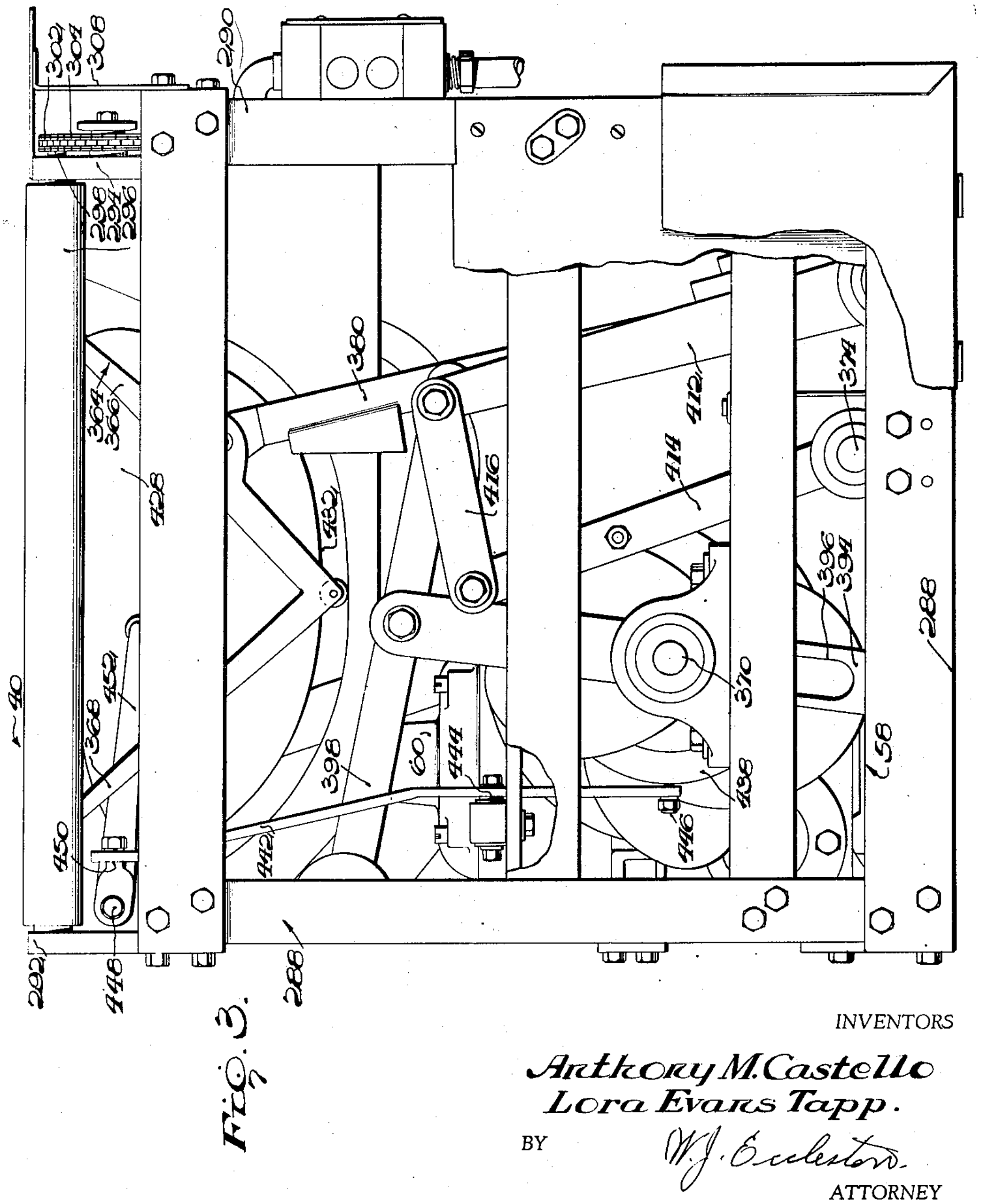
Fig. 3 is a side elevational view of the right side of the apparatus shown in Fig. 1.

Referring to Figs. 1 to 3, it will be noted that the object turning device of the present invention includes a supporting frame indicated in its entirety by the number 288. This frame has vertically extending legs 290 and a plurality of transversely and longitudinally extending frame members joined to the legs to form a rigid generally rectangular frame. Mounted upon this frame is an object supporting top, indicated as a whole by the member 40, which may be of any suitable type adapted fixedly to support objects on their flat sides, but which is shown in the drawings as consisting of a series of conveyer rollers 296 (Figs. 1 and 2) extending in a front to rear direction. These rollers are supported adjacent opposite ends upon forwardly and rearwardly extending shafts or trunnions 298 journaled in front and rear frame members 292, 294, respectively (Fig. 2). Thus, objects to be turned may readily be fed to the object turning device by a gravity or endless conveyer (not shown) aligned with the top of the device.

The rollers 296 which are grouped as shown in Fig. 1 to provide four spaces 300 extending from front to rear of the top 40 preferably are positively driven intermittently to move objects to be turned to the proper turning position with respect to the top 40 or to move objects which have been turned from this top. For this purpose the rear ends of the roller shafts 298 are extended rearwardly with respect to the rear frame member 294 a sufficient distance to receive a sprocket, one of which is shown at 302 in Fig. 2. The sprockets 302 are fixed upon the roller shafts 298 and may be driven by a sprocket chain fragmentarily shown at 304 which is trained over the sprockets 302 and is intermittently driven by any suitable means. For example, in those installations in which the object turning device is fed by an endless conveyer the roller sprockets 302 may be driven from the endless conveyer. A protective cover 308 (Figs. 2 and 3) of sheet metal preferably is provided along the rear side of the top 40 to enclose the sprockets 302 and sprocket chain 304.

The operating mechanism for angularly turning objects on top 40 is indicated in its entirety by the number 58, and is mounted in the framework 288 below the rollers 296 in the top of the framework 288. This mechanism comprises four tilting forks 364 (Figs. 3 and 5) aligned with the four spaces 300 (Fig. 1) between the grouped rollers 296 in the top 40 and normally disposed wholly below the plane of the top. These forks which have substantially right angularly disposed arms 366 and 368 are operated in unison to tilt an object on the top 40 by operating mechanism including a rotatable main drive shaft 370 and forward, intermediate and rear rockshafts 372, 374, and 376, respectively, rockable upon fixed axes. These shafts are mounted in suitable bearings carried in the framework 288 below the top 40 and they extend from side to side of the frame in a direction parallel to the front and rear sides thereof. One of the bearings for the rear rockshaft 376 is shown at 378 in Fig. 2.

Each of the forks 364 is connected to the rear rockshaft 376 by an extensible operating rod 380 (Fig. 5) comprising a telescopically interrelated guide arm 382 and tube 384. The four guide arms 382 are fixed at one end to the rear rockshaft 376 by welding or the like spaced from each other to conform with the spacing of the forks 364 and extending outwardly from the rear rockshaft 376 in a common radial plane. The tubes 384 which are telescopically received over these arms 382 have a lug 386 on their upper ends adapted to be pivotally connected between bifurcations on the back side of the rear arms 366 on forks 364.

Figure 4:
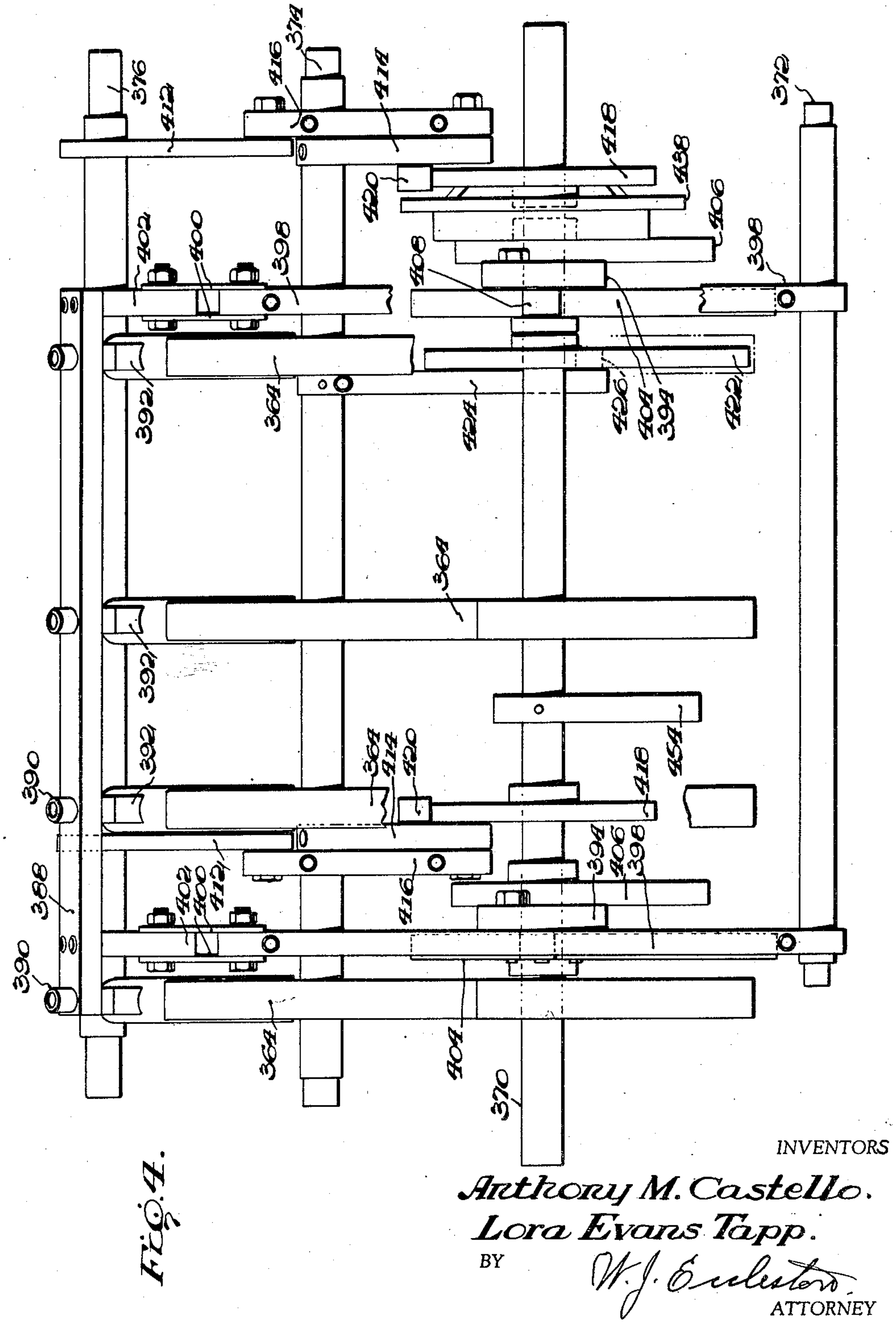
Fig. 4 is a top plan view partly broken away of the cam and lever mechanism in the object turning device of the present invention disassociated from the rest of the object turning unit.

Adjacent their lower ends, these tubes are interconnected by a cross bar 388 (Figs. 4 and 5) secured by cap screws 390 to raised seats 392 welded to the tubes 384. By virtue of the construction described above, the operating rods 380 may be rocked in unison by rocking the rear rockshaft 376 and may be telescopically extended or contracted in unison by forces applied to the cross bar 388 tending to raise or lower the same. This movement of the operating rods 380 transmits vertically and horizontally directed forces to the forks 364 which forces cooperate to move the forks in a manner to effect a 90° rotation of the object on top 40 as described hereinafter.

Figure 5:
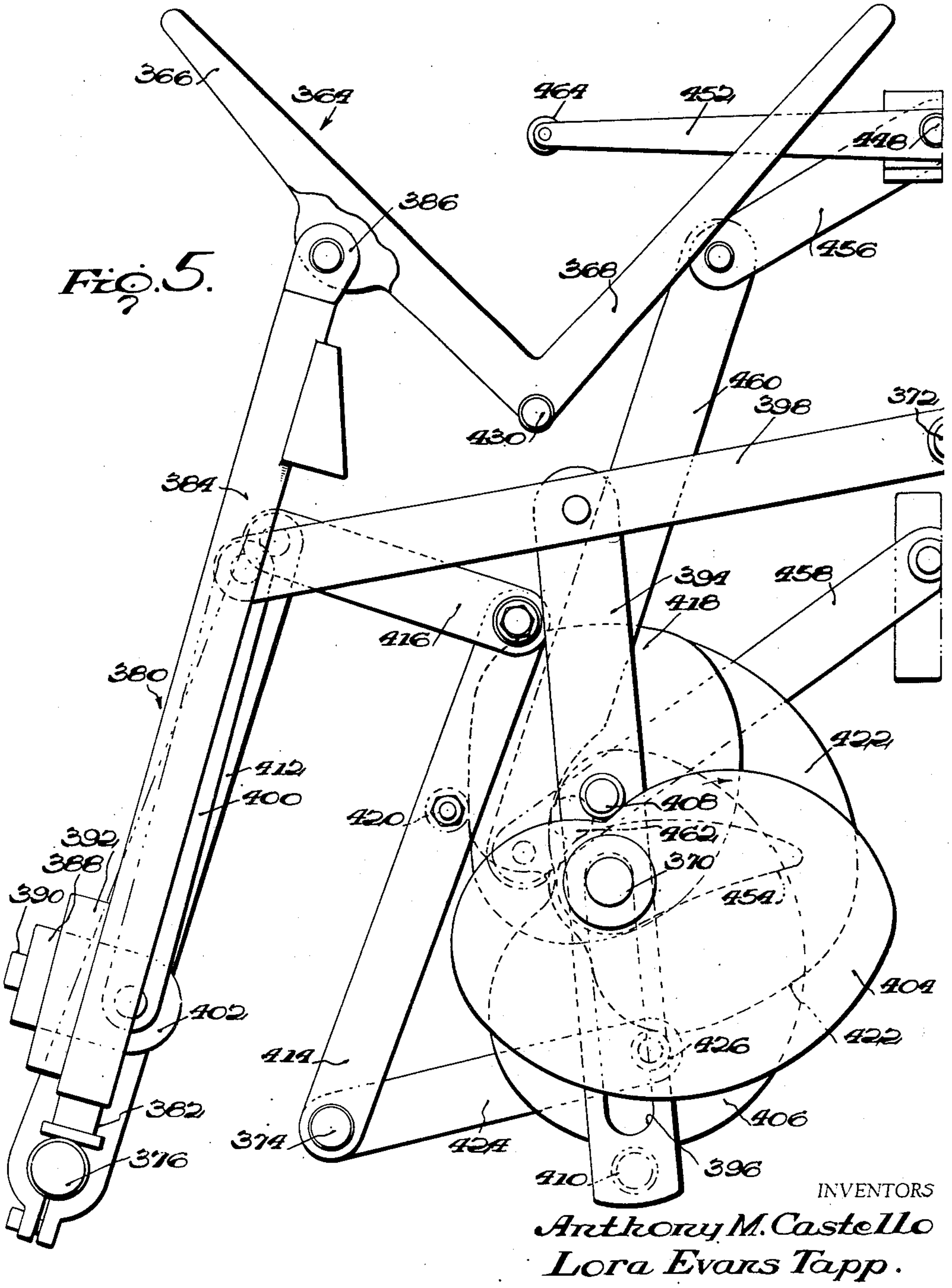
Fig. 5 is a side elevational view on an enlarged scale of the cam and lever mechanisms in the object turning device of the present invention disassociated from the rest of the device showing the positions these mechanisms assume when the device is at rest.
Figures 6, 7:
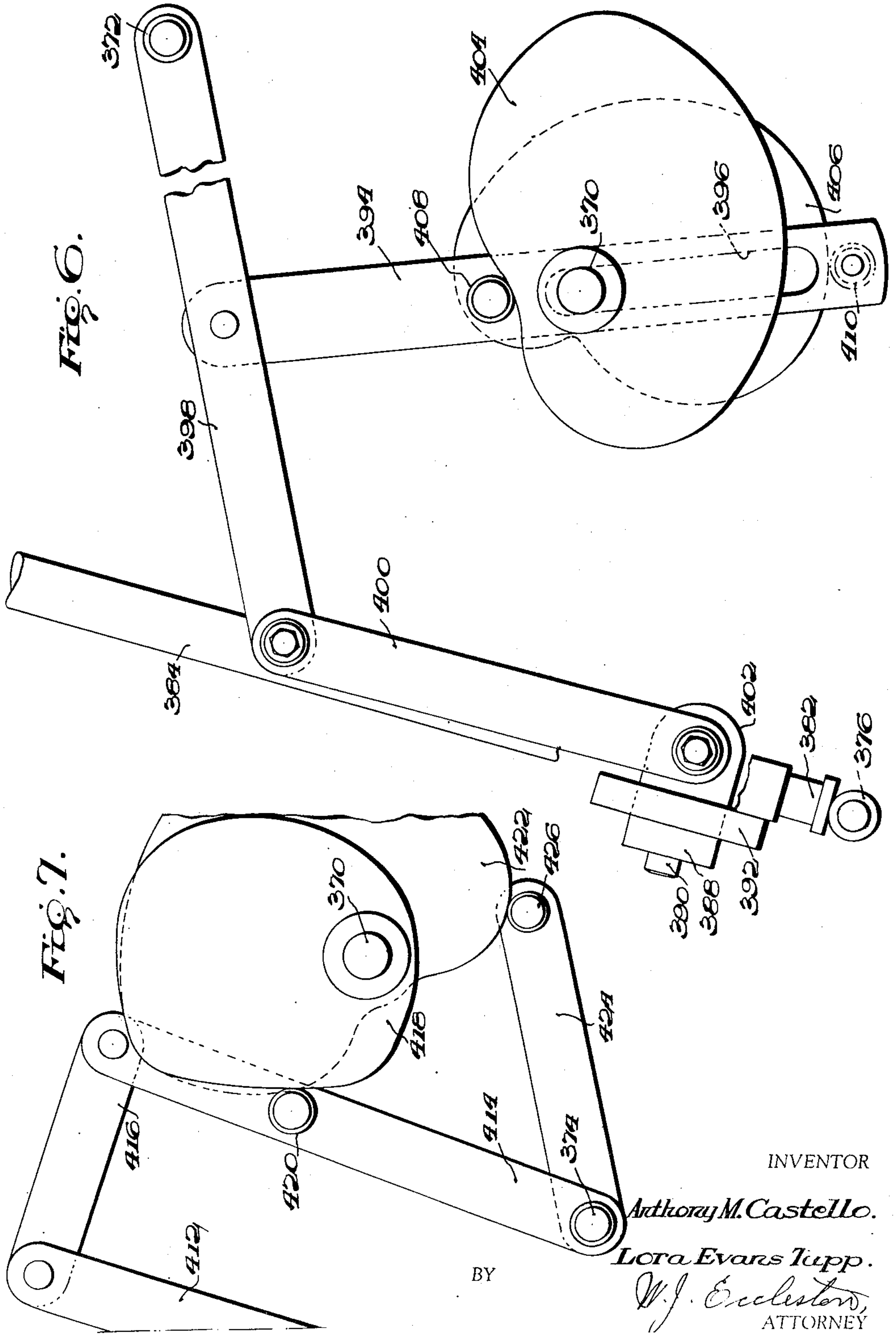
Fig. 6 is a fragmentary side elevational view on an enlarged scale of a portion of the cam and lever mechanism of the object turning device of the present invention disassociated from the rest of the device.
Fig. 7 is a view similar to Fig. 6 of another portion of this mechanism.

In order to impart vertically directed forces to the forks 364 the tubular portions 384 of the operating rods 380 are reciprocated in an endwise direction by two cam and lever mechanisms one of which is shown in Fig. 6 disassociated from the rest of the tilting mechanism and both of which are actuated from the main drive shaft 370. These cam and lever mechanisms are located adjacent opposite sides of frame 288 and since they are of duplicate construction only one need be described. This mechanism comprises an arm 394 having an elongated slot 396 in one portion thereof engaged over the main drive shaft 370 so that the arm is movable in an endwise direction on the drive shaft. At its upper end the arm 394 is rockably secured to the intermediate part of a lever 398 fixed adjacent its front end upon the front rockshaft 372 (Fig. 5) and connected at its rear end by a pair of links 400 to a lug 402 anchored to the crossbar 388 connecting the lower ends of the tubes 384.

Slotted arm 394 is reciprocated vertically by cooperating oppositely acting cams 404 and 406 fixed upon the main drive shaft 370. Cam 404 engages a follower roll 408 pivotally secured upon the arm 394 on the topside of the slot 396 to impart upward movement to this arm while cam 406 engages a follower roll 410 pivotally secured to the arm 394 on the portion thereof below the slot 396 to impart downward movement to the arm 394. Thus, when the main drive shaft 370 is rotated, the arm 394 is reciprocated vertically causing the lever 398 to rock upon the axis of the front rockshaft 372 so that the links 400 are reciprocated and thus cause the tubular portion 384 of the operating rods 380 to telescope on the arms 382. This imparts a vertical component of movement to the forks 364.

Horizontally directed components are imparted to the forks 364 by virtue of the cooperative action of cam and lever or linkage mechanisms shown in Fig. 7 including duplicate mechanisms for effecting movement of the forks in one direction and a single mechanism cooperating therewith to effect movement of the forks in the opposite direction. Only one of the duplicate mechanisms will be described in detail. This mechanism includes a quadrilateral lever system comprising two links 412 and 414 (Figs. 5 and 7) fixed at their lower ends, respectively, upon rear rockshaft 376 and intermediate rockshaft 374. At their upper ends these links are interconnected by a third link 416 pivotally connected at its opposite ends to the upper ends of links 412 and 414. Rearward rocking movement is imparted at certain intervals to this system of links and through the latter to the rear rockshaft 376 by a cam 418 fixed on the main drive shaft 370 and engaging a follower 420 pivotally secured upon link 414.

Forward rocking movement is imparted to the intermediate rockshaft 374 and through the quadrilateral linkage just described to the rear rockshaft 376 by the second mechanism which comprises a cam 422 fixed on the main driveshaft 370 and a lever 424 fixed at one end on the intermediate rockshaft 374 and having a follower 426 on its opposite end for engaging the periphery of cam 422. The two cam and linkage systems just described operate in opposition so that the rear rockshaft 376 is positively rocked both in a forward and in a rearward direction. As a result of the rocking movement of the rear rockshaft 376 horizontally directed components of force are imparted to the forks 364 through the operating rods 380.

To control the course of movement of the forks 364 resulting from the vertically and horizontally directed forces imparted thereto by the mechanism just described, a face cam 428 (Fig. 2) is provided for each fork. These cams are of duplicate construction and are fixed to a stationary part of frame 288 in closely spaced relation to the forks 364 (Fig. 1). The latter each have a follower 430 adjacent the junction of their two arms. These followers engage in continuous generally oval shaped slots 432 one of which is formed in each cam 428.

Figure 8:
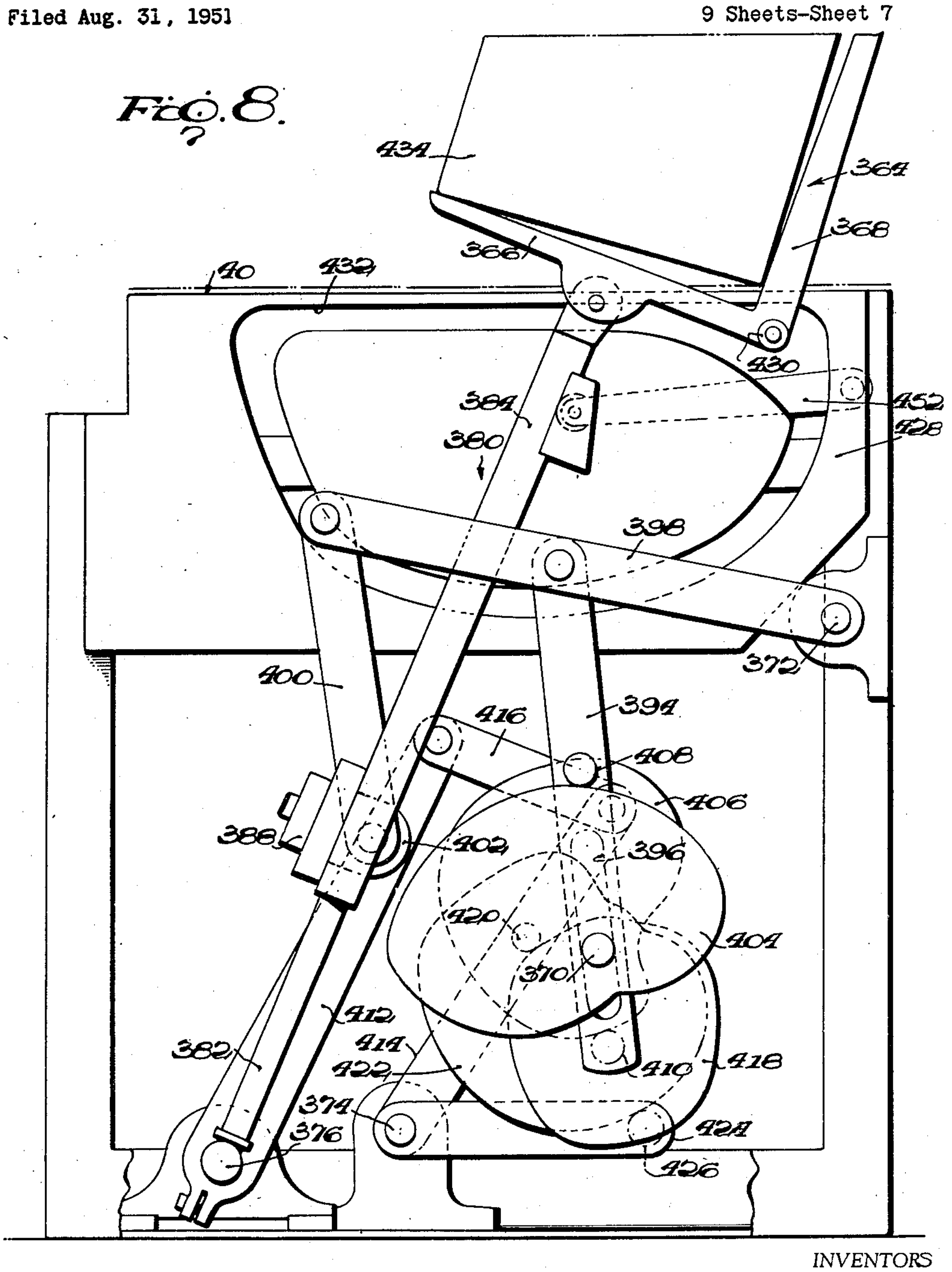
Fig. 8 is a side elevational view showing the cam and lever mechanism of the object turning device more or less diagrammatically at an intermediate position.

When the main driven shaft 370 is turned through one revolution, the vertical and horizontal components of force which are imparted to the forks 364 through the operating rods 380 are resolved by the cooperative action of the cam followers 430 in cam slots 432, the forks being moved through a cycle during which the followers 430 make a complete circuit of the cam slots 432. During the course of this cycle, the forks 364 are tilted and elevated in such a manner that a carton 434 (Figs. 8 and 9) or other object on the top 40 is raised from the same, turned clockwise or counterclockwise as seen in Fig. 8 (depending on the direction the tilting mechanism is operating) on an axis parallel to the front of the frame 288 through an angle of 90° and then redeposited in turned position on the top at substantially the position it occupied before being turned. Roller discs 436 (Fig. 1) in the front frame member 292 reduce friction between the front arm 368 of the forks 364 and the framework 288 when the forks are tilted.

Although situations may arise where it is desired merely to tilt or turn an object through 90° at a particular stage in the handling thereof, the tilting mechanism of the present invention is designed to return objects to their original position of rest after they have been turned as above described through 90° in one direction. Under the latter circumstance the object is most easily returned to its original position by turning the object in the reverse direction to that it was originally turned. To effect this reverse turning movement, the direction of rotation of the main drive shaft 370 is reversed and a jogging mechanism now to be described is provided in the tilting mechanism. This jogging mechanism is driven from cam 438 (Figs. 1 and 3) fixed on the main drive shaft 370 and having a peripheral slot 440 with an axial offset approximately 70° in end-to-end length. A lever 442 rockably secured at 444 upon the frame 288 has a follower 446 on its lower end which rides in the slot 440 and thus effects rocking movement of the lever 442 in a plane parallel to the front edge of the frame 288.

At its upper end this lever is loosely connected to a pivotally rockable and longitudinally reciprocable shaft 448 by a suitable connection 450 adapted to effect endwise movement of the shaft 448 when the lever 442 is rocked. This movement of the shaft 448 moves four horizontally extending arms 452 fixed on the shaft 448 between an inoperative position on the side of the forks 364 opposite the face cams 428 and an operative position at which the arms 452 are in the planes of the forks 364. Once during each revolution of the main drive shaft 370, the arms 452 are moved into the plane of the forks 364 and are rocked counterclockwise while in that position by mechanism to be described so as to jog the forks upwardly a slight distance. Although the forks are jogged on both forward and return movement thereof, its effect otherwise alters the course of movement of the forks only on their return and for a purpose to be described.

Pivotal rocking movement is imparted to the shaft 448 by quadrilateral linkage actuated periodically by a trip finger 454 (Figs. 1 and 5) fixed on the main drive shaft 370. This quadrilateral linkage comprises a first link 456 fixed at one end upon the shaft 448, a second link 458 rockably secured at one end by suitable means to the front side of the frame 288 and a third link 460 pivotally secured at its opposite ends to the free ends of the first and second links. A roller 462 on the link 458 is engaged by the trip finger 454 to rock the linkage consisting of links 456, 458, and 460 upwardly. This occurs at the point in the revolution of the main drive shaft 370 at which the arms 452 have been moved into the plane of the forks 364 by endwise movement of the shaft 448 effected through the cooperative action of cam 438 and lever 442. As a result, the arms 452 are rocked upwardly for a purpose which will be described subsequently. Preferably rollers 464 (Fig. 5) are pivotally secured to the free ends of arms 452 so that contact with the forks 364 is made by these rollers.

The main drive shaft 370, from which all of the tilting mechanisms are driven, is driven by a reversible electric motor 60 (Fig. 1) mounted in the front end of frame 288. This motor drives a speed reducer 466 which has an output shaft 468 that drives a sprocket 470 through a load limit jaw clutch 472. This clutch has driving and driven elements with complementary generally triangular shaped interengaging teeth 471 held in driving engagement by a compression spring 473 so that these two elements are free to slip relative to each other should the torque required to drive the tilting mechanism exceed a predetermined value.

Figure 10:
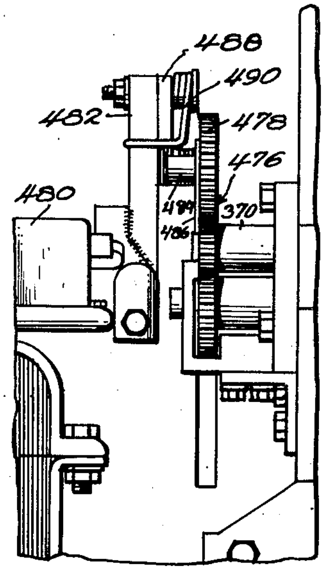
Fig. 10 is a fragmentary side elevational view of the switch which automatically terminates operation of the object turning mechanism when an object has been turned through a predetermined angle.

Through a chain drive 474 and intermediate gearing 476 a gear 478 keyed to the main drive shaft 370 is driven from the driving element of clutch 472. Since the tilting mechanism 58 is designed to operate through a complete cycle in one direction and consequently to operate the forks 364 through a course which effects a 90° rotation of a carton 434 on the top 40 during a single revolution of the cams on main drive shaft 370, a limit switch 480 (Figs. 2 and 10) is provided to open the circuit to motor 60 each time the drive shaft 370 completes a revolution in either direction. This switch also operates to effect reversals in the direction of rotation of the motor 60 upon successive energizations thereof.

The movable contact of this switch is operated by an arm 482 which is fixed upon a rotatable switch operating shaft (not shown) in the switch 480. This arm and shaft are rockable from a point at which the arm makes a predetermined angle with the vertical on one side thereof to a corresponding point on the opposite side of the vertical. Shifting of the arm 482 from one position to the other operates to de-energize the motor 60 and to condition its circuit for reversing the flow of current therethrough the next time it is energized thereby to reverse the direction of rotation of the motor. In Fig. 2 the arm 482 is shown in the position it assumes to cause the motor to rotate in a direction to drive the main drive shaft 370 clockwise as seen in that view and in Figs. 8 and 9.

The mechanism for rocking switch arm 482 comprises a finger 484 carried by a base plate 486 adjustably attached to the main drive gear 478 which finger projects axially outwardly of this gear so as to be carried into contact with a cooperating finger 488 on the upper end of switch arm 482 at a predetermined point in the rotation of the main drive shaft 370. The latter finger is biased into coextensive relation with arm 482 by a spring 490 so that arm 482 tends to move with gear 478 when the finger 484 is carried into engagement with the finger 488. This movement will continue until the arm 482 is carried beyond the vertical whereupon the arm will rock gravitationally to its opposite limit of movement, thus de-energizing the motor 60 and conditioning the same to be operated in the reverse direction the next time it is energized. The biased mounting of the finger 488 allows it to rock far enough so that gear driven finger 484 may pass it should the motor accidentally rotate in the wrong direction or the switch arm 482 become stuck.

Figure 11:
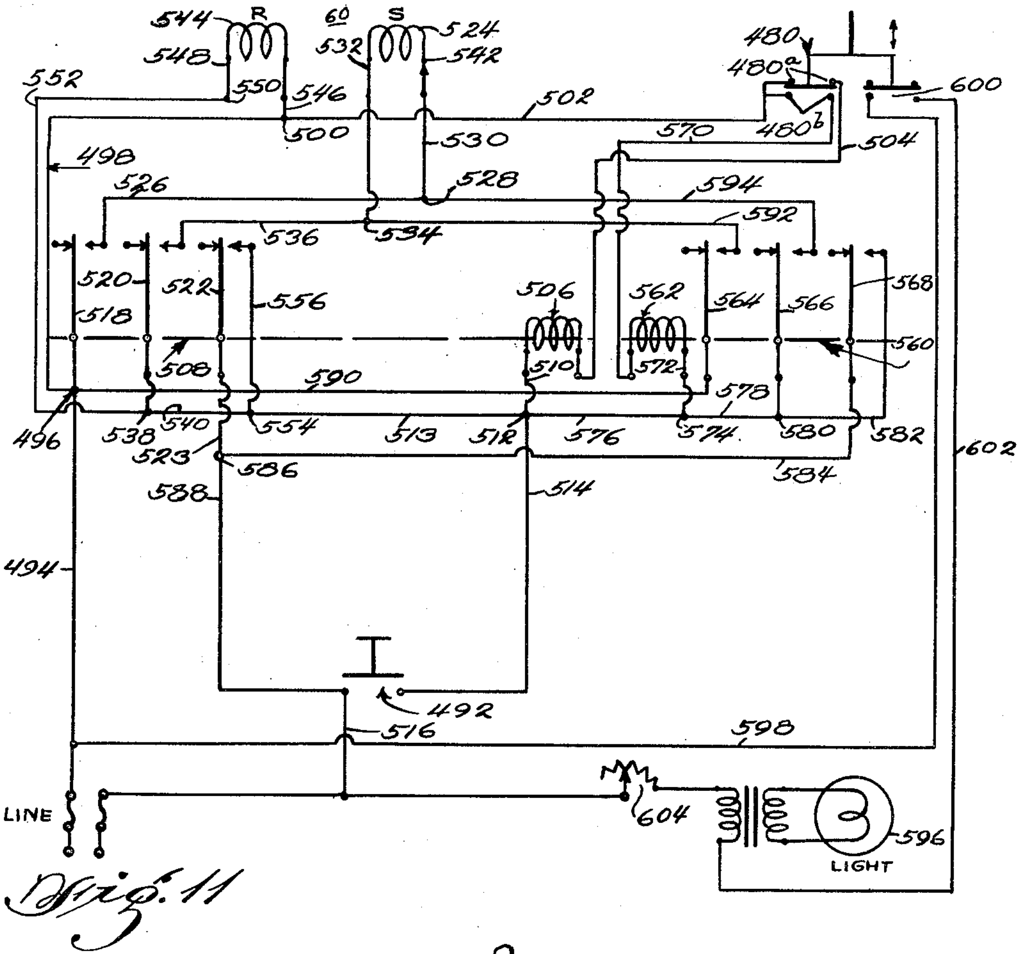
Fig. 11 is a schematic wiring diagram of the control system for the object turning device of the present invention.

Operation of the motor 60 which drives the tilting mechanisms 58 is controlled by the control system schematically shown in Fig. 11 which shows the reversible drive motor 60 and reversing switch 480 diagrammatically. Energization of this control circuit is controlled by a push switch 492 which may be located upon any suitable part of the frame 288 or at a location remote from the machine. Assuming that Fig. 11 shows the control circuit at the position that its elements assume when the machine is at rest and that reversing switch 480 is at the position it assumes to cause the motor 60 on its next cycle of operation to rotate the main drive shaft 370 clockwise, operation of the push button switch 492 closes the several circuits now to be described.

Firstly, a relay energizing circuit is closed including a conductor 494 connected to one side of the source of current and to a junction 496. From this junction a conductor 498 leads to a junction 500 which is connected by a conductor 502 to one of a pair of contacts 480*a* in the reversing switch 480. The other contact 480*a* is connected by a conductor 504 to one side of a relay coil 506 in a relay 508. The circuit for the coil 506 to the side of the source of current supply opposite that to which the conductor 494 is connected is completed through a conductor 510, a junction 512, a conductor 514, push button switch 492 and a conductor 516. This circuit remains closed only as long as push button switch 492 is closed, but even though only momentarily closed it energizes the relay 508.

Energization of this relay reverses the position of switch blades 518, 520 and 522, thus closing several circuits including a holding circuit for the relay 508. This holding circuit includes conductor 494, junction 496, conductor 498, junction 500, conductor 502, switch contacts 480*a*, conductor 504, coil 506, conductor 510, junction 512 and back to the source on the side opposite conductor 494 through a conductor 513, a junction 554, a fixed switch blade 556, movable switch blade 522, a conductor 523, a junction 586, and conductors 588 and 516. The relay thus maintains its movable contacts in shifted position until its holding circuit is opened under circumstances which will be explained.

Operation of the motor 60 is initiated by energization of its starting winding 524 through a circuit including the conductor 494, junction 496, movable switch blade 518, a conductor 526, a junction 528, a conductor 530 to one side of the winding 524. The other side of this winding is connected to the source of current through a conductor 532, a junction 534, a conductor 536, movable switch blade 520, a junction 538, a conductor 540, a junction 554, fixed switch blade 556, movable switch blade 522, and conductors 523, 588, and 516. This starts operation of the motor 60 and after it has attained speed, the starting winding is de-energized by the operation of a centrifugal switch 542. However, operation of the motor is continued by its running winding 544 which is energized through conductor 494, junction 496, conductor 498, junction 500, and a conductor 546 leading to one side of the winding 544 which is connected on its opposite side to the opposite side of the source of supply from conductor 494 by a conductor 548, a junction 550, a conductor 552, junction 538, conductor 540, junction 554, fixed switch blade 556, movable switch blade 522, and conductors 523, 588, and 516.

Thus, the motor will continue to operate until trip finger 484 engages rockable arm 482 on switch 480 (Fig. 2). This throws the movable contact in switch 480 out of engagement with contacts 480*a* and into engagement with contacts 480*b*. Since the holding circuit for relay 508 is closed through contacts 480*a*, the coil 506 will be de-energized and the switch blades 518, 520 and 522 will snap back into the position shown in Fig. 11 thus de-energizing motor winding 544 and discontinuing operation of the motor 60 when the circuit through contacts 480*a* is opened.

Operation of the push button switch 492 while the contacts 480*b* in switch 480 are closed energizes a relay 560 which has a coil 562 and movable switch blades 564, 566, and 568. Coil 562 is energized from one side of the source of supply of current through conductor 494, junction 496, conductor 498, junction 500, conductor 502, switch contacts 480*b*, a conductor 570, coil 562, a conductor 572, a junction 574, a conductor 576, junction 512, conductor 514, push button switch 492 and conductor 516. Energization of the coil 562 swings the movable switch blades 564, 566 and 568 to the opposite position from that shown in Fig. 11.

This closes a holding circuit for coil 562 which comprises conductor 494, junction 496, conductor 498, junction 500, conductor 502, switch contacts 480*b*, conductor 570, coil 562, conductor 572, junction 574, a conductor 578, a junction 580, a conductor 582, movable switch blade 568, a conductor 584, junction 586, and conductor 588 back to conductor 516 which is connected to the side of the source of current opposite that to which conductor 494 is connected. Switch blades 564, 566 and 568 are therefore maintained in their shifted position.

The starting winding 524 for motor 60 is then energized through a circuit including conductor 494, junction 496, a conductor 590, movable switch blade 564, a conductor 592, junction 534, and conductor 532 to one side of starting winding 524, while the other side of this winding is connected to the side of the source of current opposite conductor 494 by conductor 530, junction 528, a conductor 594, movable switch blade 566, junction 580, conductor 582, movable switch blade 568, conductor 584, junction 586, and conductors 588 and 516. It should be noted that the direction of flow of current through the starting winding is the reverse of that previously described and therefore the motor 60 will be operated in the reverse direction from that it previously operated.

The running winding 544 of motor 60 is energized through a circuit including conductor 494, junction 496, conductor 498, junction 500, conductor 546, winding 544, conductor 548, junction 550, conductor 552, junction 538, conductor 540, junction 554, conductor 513, junction 512, conductors 576 and 582, movable switch blade 568, conductor 584, junction 586, and conductor 588 leading to conductor 516. Motor 60 will thus continue to operate in a direction to drive the mechanism 58 counterclockwise until the switch tripping finger 484 is brought into contact with the swingable arm 482 on the switch 480 and swings the same back to the position at which the contacts 480*a* are closed. Since this opens the holding circuit for relay 560, it will resume the position shown in Fig. 11. This also opens the circuit to the running winding 544 of the motor 60 so that operation thereof is discontinued.

In order to apprise an operator of the direction in which the object on the object turning apparatus is being turned, a signal lamp 596 is provided. This lamp is energized when the motor 60 is driving the tilting mechanism 58 counterclockwise through a circuit which includes a conductor 598 connected to conductor 494 and one of a pair of contacts 600 that are connected only when reversing switch 480 is in a position to cause the motor 60 to drive the tilting mechanisms 58 counterclockwise. The other contact 600 is connected to the opposite side of the source of supply of current by a conductor 602 which may have a rheostat 604 therein to control the brilliance of the lamp 596.

In describing the operation of the tilting mechanism 58, it will be assumed that Figs. 2 and 11 show the tilting mechanisms and the control system, respectively, in the positions they assume to cause the motor to rotate the main drive shaft 370 clockwise when push button switch 492 is operated. It will be noted that switch tripping finger 484 is at the high point of its course and that rockable switch arm 482 is to the left of the vertical. When the tilting mechanism 58 comes to rest after completing a cycle in either direction, it assumes the position shown in Fig. 2, but rockable switch arm 482 will alternately be to the right of the vertical rather than to the left.

If the push button switch 492 is pressed momentarily, the motor 60 will be operated in a direction to drive the main drive gear 478 and main drive shaft 370 clockwise as previously explained. Cams 418 and 422 on this drive shaft which cooperate respectively with links 412, 414 and 416 and with lever 424 will then be driven in a direction initially to cause rear rockshaft rocking links 412, 414 and 416 to rock the rear rockshaft 376 clockwise as seen in Fig. 2. This continues for approximately half a turn of the main drive shaft but at a negative acceleration.

At the same time the operating rod cams 404 and 406 will be rotated in a clockwise direction thus causing arms 394, levers 398 and links 400 to be operated for a short interval in a direction to contract or shorten telescopic operating rods 380 and thereafter to elongate the same until the main drive shaft 370 has made approximately one-half turn. This simultaneous application of these forces to the forks 364, i. e., clockwise rocking movement and successive contraction and elongation of operating rods 380, causes the forks to be moved in a direction to bring cam followers 430 thereon into engagement with the outer sides of cam slots 432 in the face cams 428. As a result the forks 364 slowly move forward (to the right in Fig. 2) and at the same time tilt counterclockwise to carry rear arms 366 on the forks toward the horizontal and arms 368 toward the vertical.

This continues until followers 430 are some distance past the low point in cam slots 432. The operating rod elongating and shortening cams 404 and 406 are conformed to effect an abrupt change in the direction of actuation of the operating rod operating linkage 394, 398, and 400 at this time to cause the operating rods 380 to elongate rather than shorten. For an interval thereafter forward movement of the forks 364 is continued at a slower rate while the rate at which the operating rods 380 elongate increases rapidly, thus causing the forks 364 to rise to a position at which rear arms 366 thereon engage the downwardly facing side of the carton 434 on top 40 and the carton is slightly raised bodily from the top, the arms 366 being of sufficient length to extend under the major portion of the length of the downwardly facing side of the carton so that that carton will balance on the forks. This will have occurred when the main shaft 370 has been rotated through approximately one-half turn. By this time the followers 430 will have arrived at the point shown in Fig. 8, i. e., at the upper forward end of cam slots 432. Continued elongation of the operating rods 380 by their elongating mechanism causes the forks 364 to tilt in a clockwise direction about the axis of the followers 430.

Figure 9:
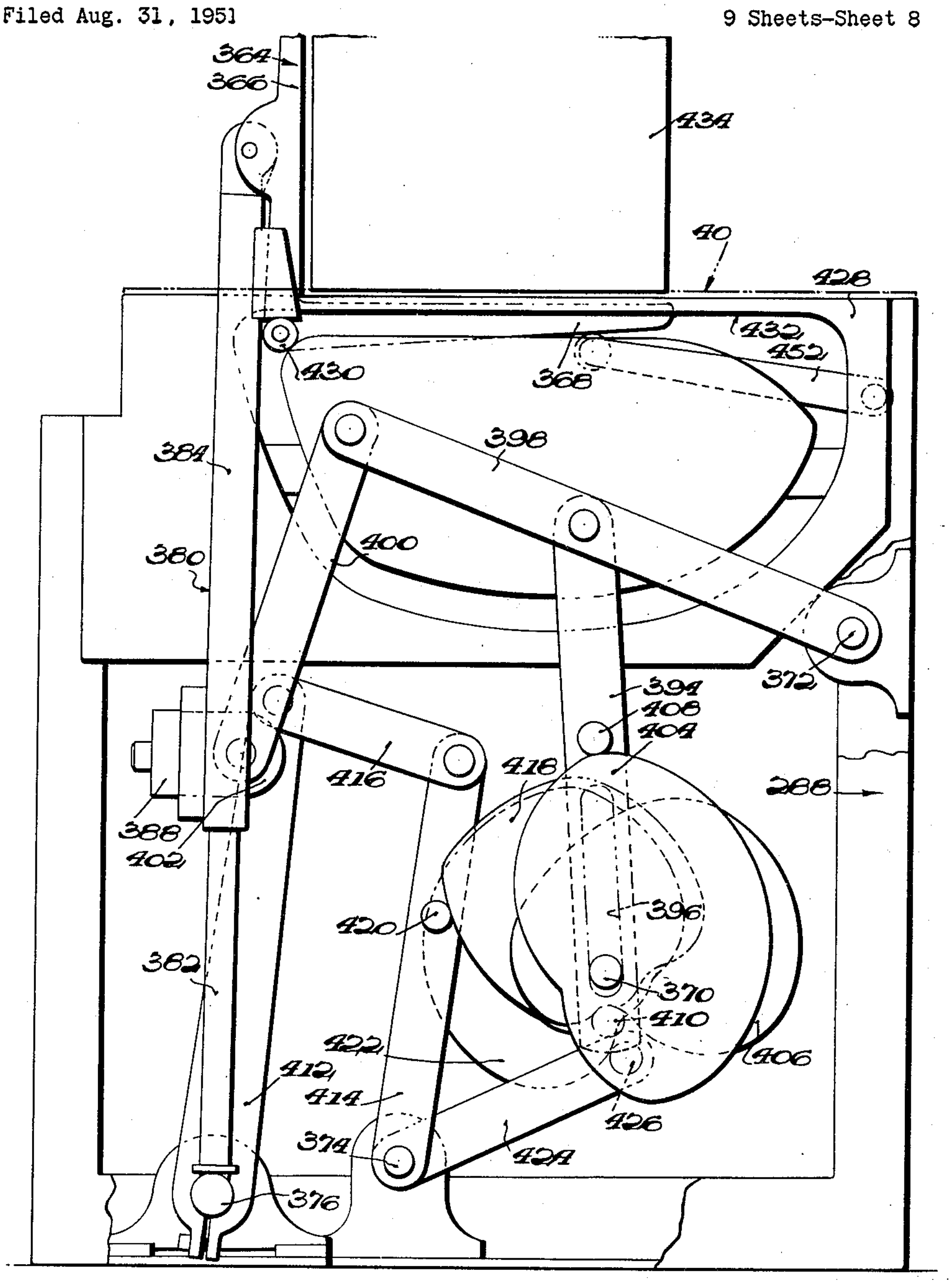
Fig. 9 is a view similar to Fig. 8 showing the cam and lever mechanisms at still another position which they assume during the course of a cycle of operation of the object turning device.

At about this time, in other words, after about a half turn of the main drive shaft, the direction of rocking movement of the rear rockshaft 376 is reversed by operation of the rockshaft rocking cams 418 and 422 so that this rockshaft begins to rock counterclockwise rather than clockwise and effects rearward movement of the forks 364. At the same time operating rods 380 are elongating so that the followers 430 are caused to move into the upper horizontal portion of cam slots 432. The continued application of these forces to the forks 364 during the next increment of rotation of main drive shaft 370 causes the forks to tilt in a clockwise direction on the axis of followers 430 and to move toward the rear end of cam slots 432. Operation of the tilting cams 418 and 422 and operating rod telescoping cams 404 and 406 is so correlated and synchronized that the forks 364 will have been tilted clockwise through an angle of 90° as the followers 430 approach the rear end of cam slots 432 as shown in Fig. 9. Moreover, the operating rod telescoping cams 404 and 406 will then have begun to operate the linkage 394, 398 and 400 in a direction initially slowly to contract the operating rods 380 so that the followers 430 are caused to follow the downwardly curved rear end of the inner side of cam slots 432 thus retracting the forks 364 so that the carton 434 is deposited on the table 40 resting on what was originally its forwardly facing side as shown in Fig. 9. This occurs as the main drive shaft 370 completes approximately ¾ of a turn.

At about the time the carton 434 is deposited on the table 40 the trip finger 454 (Fig. 5) on main drive shaft 370 rocks the links 456, 458, and 460 thus rocking shaft 448 and arms 452 counterclockwise as seen in Fig. 3. This occurs while the arms 452 are in the plane of forks 364 so that these arms underlie the arms 368 on the forks 364 and the latter are thus raised or jogged at their forward ends in a direction to tilt forks 364 counterclockwise as seen in Fig. 9. This has no other effect on the operation of the tilting mechanism 58 when the latter is being operated in a direction to turn the forks clockwise as just described. Its purpose will be described subsequently.

Continued rotation of the main drive shaft 370 through a complete turn in a clockwise direction results in continued contraction of the operating rods 380 and a reversal in the direction of rocking movement of the rear rockshaft 376 so that the followers 430 on the forks 364 are moved into the downwardly inclined rear portion of cam slots 432 which merge into the forwardly extending part of the slots causing the forks 364 to tilt in a counterclockwise direction while their cam followers 430 are moving along this portion of slots 432. By the time one revolution of the main drive shaft 370 has been completed, this clockwise rocking of the rear rockshaft 376 and contraction of the operating rod 380 brings the forks 364 to a position at which they are fully retracted below the top 40.

As the main drive shaft and gear 478 approach completion of one turn, trip finger 484 (Fig. 2) is carried against rockable switch arm 482 so that the latter is raised towards the vertical and after being moved to the right of the vertical, it rocks gravitationally to its right hand limit of movement. This opens the contacts 480*a* (Fig. 11) and closes contacts 480*b*, thus conditioning the control system for operating motor 60 in a direction the next time it is energized to drive main drive shaft 370 counterclockwise as previously explained.

As a result, the fork operating mechanism and forks will be driven through a cycle of movement the reverse of that just described the next time motor 60 operates. During the first quarter turn of the main drive shaft 370 in the reverse cycle, the fork operating rods 380 will be rocked counterclockwise and elongated so that the forks 364 will be brought approximately to the position shown in Fig. 9 at which the carton 434 on the top 40 is about to be engaged by the forks. At about this time, the direction of rocking movement of rear rockshaft 376 changes from counterclockwise to clockwise and causes the operating rods 380 to be rocked forwardly rather than rearwardly. In addition, at this time or shortly thereafter, finger 454 rocks jogging linkage 456, 458 and 460 in a direction to rock shaft 448 and arms 452 clockwise (Figs. 5 and 9). This raises the forward ends of the forks 364 to assure movement of the followers 430 on these forks out of the rear downwardly inclined portion of the cam slots 432 and into the upper horizontal portions thereof as forward rocking movement of the operating rods 380 continues.

As the clockwise rocking movement of operating rods 380 continues the operating rod elongating and shortening mechanism contracts the operating rods. As a result of the forces imparted to the forks by the contraction of the operating rods 380 and the simultaneous constraining effect of the followers 430 during the course of the movement of the latter from the rear to the front end of the horizontal portions of cam slots 432, the forks 364 and the carton carried thereby are rocked counterclockwise to the position shown in Fig. 8. It will be observed in that view that the carton 434 is about to be brought to rest upon the top 40 at the same position relative thereto that it originally occupied. Since it has been turned 90° counterclockwise, it will be brought to rest on the same side as that on which it originally rested when the forks are subsequently retracted as a consequence of the continued movement of main drive shaft 370 the half turn necessary to complete one revolution thereof counterclockwise.

Upon completion of one turn of the main drive shaft 370 in a counterclockwise direction, the reversing switch 480 will be moved to a position to open contacts 480*b* and close contacts 480*a* so that the motor 60 will operate in a direction to drive the tilting mechanisms 58 clockwise the next time push button switch 492 is pressed.

From the foregoing description of the construction and operation of the improved object turning device of the present invention some of the advantages thereof will be apparent. It is to be noted that the control system described above is more or less exemplary and adapts the present invention particularly for use in the X-ray inspection apparatus previously identified. Other control systems could be used for causing the tilting mechanism 58 to operate in the same direction on successive cycles thereof or in some other manner. However, one advantage of the control system described herein arises from the fact that the initiation of a cycle of operation of the tilting mechanism is under the complete control of the operator through push button switch 492 so that the object on the top 40 may be allowed to remain at a particular position for as long as desired.

Another advantage of the device of the present invention is the fact that the operating mechanism by means of which an object on the top 40 is tilted or turned is retractable in is entirety below the level of the top when this tilting mechanism is inoperative. The top 40 is thus left free of obstructions.

While a preferred embodiment of the invention has been shown and described, it will be apparent that numerous variations and modifications thereof may be made without departing from the underlying principles of the invention. It is desired, therefore, by the following claims to include within the scope of the invention all such variations and modifications by which substantially the results of the invention may be obtained through the use of substantially the same or equivalent means.

We claim:

1. An object turning device comprising a framework supporting a stationary object support, a cradle comprising a plurality of duplicate forks, means synchronously to apply horizontal and vertical forces to said forks including a shaft rockably supported in said framework, operating means for each fork each comprising duplicate first members fixed at one end thereof to said shaft so as to lie in a common plane and duplicate second members operatively connected respectively to corresponding parts of said forks respectively and to said first members for endwise movement relative to the latter, a crossbar rigidly to interconnect said second members so as to constrain the same for synchronous movement, horizontally rockable linkage operatively connected to rock said shaft, vertically rockable linkage operatively connected to said crossbar to move the said second members in an endwise direction in synchronism, drive means to rock said linkage simultaneously, and means to constrain said forks for synchronous movement through a predetermined cycle in response to the vertical and horizontal forces applied thereto by the simultaneous rocking movement of the operating means and endwise movement of the second members thereof.

2. An object turning device comprising a framework, means forming an object supporting surface on said framework including a plurality of duplicate spaced parallel conveyor rollers rotatably mounted in said framework upon horizontally extending axes so as to define a common plane of rolling contact, a cradle adapted to receive an object to be supported, operating means rockably mounted adjacent one end thereof upon a horizontal axis and operatively connected to said cradle adjacent the other end thereof including members movable relatively in an endwise direction, cooperating drive means simultaneously to rock said operating means and move the members thereof relatively in an endwise direction thereby simultaneously to apply vertically and horizontally directed forces to said cradle, means to constrain said cradle for movement through a predetermined cycle effective to tilt an object on said supporting surface through a predetermined angle in each cycle thereof, cyclically operable means for driving said cooperating drive means, and an independently controlled independent power means positively to rotate said conveyor rollers for moving objects to and from a position at which they may be turned by the cradle.

3. An object turning device comprising means forming an object support, a cradle adapted to receive a supported object, an elongated cradle operating means mounted adjacent one of its ends to rock upon a fixed axis and operatively connected adjacent its opposite end to said cradle including members operatively connected for relative endwise movement longitudinally to extend or contract said operating means, cooperating drive means cyclically and substantially simultaneously to impart predetermined rocking movement to said operating means as an entirety and relatively to move the said members through a predetermined cycle in an endwise direction substantially simultaneously to apply angularly directed forces in the same plane to said cradle, means to constrain movement of said cradle to a predetermined course in response to the forces imparted thereto, a reversible motor for reversely driving said drive means, means to control operation of the motor including a manually operable control to initiate operation of the motor and a control operable automatically to discontinue operation of the motor each time the cradle completes one cycle of operation in either direction over said predetermined course, and a reversing switch automatically to effect a reversal in the direction of operation of the motor on succeeding cycles of operation thereof.

4. An object turning device comprising means forming an object support, a cradle adapted to receive a supported object, elongated cradle operating means mounted adjacent one of its ends to rock upon a fixed axis and operatively connected adjacent its opposite end to said cradle including members operatively interconnected for relative endwise movement longitudinally to extend or contract said operating means, cooperating drive means cyclically and substantially simultaneously to impart predetermined rocking movement to said operating means as an entirety and relatively to move said members through a predetermined cycle in an endwise direction so that angularly directed forces are exerted in a single plane on a single point of said cradle when the operating means is driven and means to constrain said cradle for movement through a predetermined cycle during each cycle of the drive means.

5. An object turning device as defined in claim 4 in which said cradle operating means and the cooperating drive means are reversely operable so that the object on said support may be tilted reversely through a predetermined angle.

6. An object turning device as defined in claim 4 wherein the cradle is retractable to an inoperative position wholly below the plane of said supporting surface and the cycle of said drive means terminates when the cradle arrives at the said retracted position.

7. An object turning device comprising a frame, means forming a generally horizontally extending object supporting surface formed thereon having an elongated opening therein, a load supporting fork dimensioned to pass bodily through said opening, elongated fork operating means operatively connected adjacent one of its ends to said fork and mounted adjacent its opposite end to rock upon a fixed axis below and transverse to said elongated opening to swing in a vertical plane extending longitudinally of the opening, said fork operating means including members interconnected for relative movement in an endwise direction to exert generally vertically directed forces on said fork, cooperating drive means cyclically to move said members relatively in an endwise direction sufficiently to raise the fork through the opening and lower the same below the top surface thereof and substantially simultaneously to rock said operating means as an entirety thereby moving the fork longitudinally of the opening and means including cam and follower means cooperating with said fork operating means to support said fork in upright position and constrain the same for movement through a predetermined cycle in each cycle of the operating means.

8. An object turning device comprising a frame, means forming an object support on said frame, a plurality of duplicate object supporting forks adapted to be disposed in spaced relation in said frame, a rockshaft mounted in said frame, duplicate operating means for said forks each comprising duplicate first members each having an end rigidly connected to said shaft axially spaced along the same substantially to correspond with the spacing of said forks and disposed in a common plane extending radially of the shaft and duplicate second members having an end connected to said duplicate forks respectively, said second members being slidably connected to the first for endwise movement relative thereto, means rigidly to interconnect said second members to constrain the same for synchronous movement, means cyclically and substantially simultaneously to rock said operating means upon the axis of said common shaft and to move said second members in an endwise direction and means to constrain said forks for synchronous movement through a predetermined cycle in each cycle of the operating means.

9. An object turning device comprising a framework including an object supporting top surface, an object supporting cradle floatingly movable relative to said framework, cradle operating means mounted for rocking movement upon a fixed axis adjacent one of its ends and including members relatively movable in an endwise direction, means operatively to connect said cradle and operating means for relative pivotal movement, independent systems of operating linkage each operatively connected adjacent one end to said cradle operating means and rockable upon fixed axes adjacent their opposite ends including vertically rockable linkage for moving the said members relatively in an endwise direction and other linkage rockable in a fore and aft direction to rock said cradle operating means upon its axis, means for simultaneously rocking said operating linkage through predetermined cycles, and cooperating cam and follower means to constrain said cradle for movement through a cycle effective to tilt the object on said top surface through a predetermined angle in response to the forces imparted to the cradle by the cyclic operation of said linkage.

10. An object turning device comprising a framework including an object supporting top surface, an object supporting cradle, means to mount said cradle on said framework for pivotal, horizontal and vertical movement relative thereto including cradle operating means comprising elongated members movable relatively along the longitudinal axis thereof to increase or decrease the end to end length thereof and cooperating guide means on the framework and cradle, means pivotally to connect said cradle and the operating means therefor adjacent one end of the latter, said cradle operating means being rockably mounted adjacent its other end upon a fixed axis, independent systems of linkage for rocking said cradle operating means and extending and contracting the same, a shaft rotatably mounted in said framework, and a plurality of cams fixedly mounted on said shaft for operating said independent systems of linkage when the shaft is rotated, said cradle operating means and guide means cooperating when said linkage is rocked to constrain said cradle for movement effective to raise and turn an object on said supporting surface through a predetermined angle and to redeposit the same thereon in turned position.

11. An object turning device comprising a framework including an object supporting top surface, an object supporting cradle, means to mount said cradle on said framework for pivotal, horizontal and vertical movement including cradle operating means including members relatively movable in an endwise direction and cooperating guide means on said cradle and framework, means pivotally to connect said cradle and cradle operating means adjacent one end of the latter, said cradle operating means being rockably mounted adjacent its other end upon a fixed axis, means to rock said cradle operating means in opposite directions including a first system of links to rock the same in one direction and a single link operable through said first system of links to rock the cradle operating means in the opposite direction, means in said framework forming a common fixed axis for one of the ends of said first system of links and single link, means operatively to connect the other end of said first system of links and said operating means, a second system of links for extending and contracting said operating means, said latter system of links being operatively connected adjacent one end to said cradle operating means and rockable adjacent its opposite end upon an independent axis fixed in said framework, and means for simultaneously rocking said independent systems of linkage, said cradle operating means and guide means cooperating when said linkage is rocked to constrain said cradle for movement effective to raise and turn an object on said supporting surface through a predetermined angle and to redeposit the same thereon in turned position.

12. An object turning device comprising a framework including an object supporting top surface, an object supporting cradle, means to mount said cradle on said framework for pivotal, horizontal and vertical movement relative thereto including an extensible and contractible cradle operating means and cooperating guide means on said framework and cradle, means pivotally to connect said cradle and cradle operating means adjacent one end of the latter, said cradle operating means being rockably mounted adjacent its other end upon an axis fixed in said framework, means to rock said cradle operating means in opposite directions including a first system of links to rock the same in one direction and a single link to rock the same in the opposite direction, a shaft rockably supported in said framework, said first system of links and single link being fixed adjacent one of their ends upon said shaft so as to rock in unison, means operatively to connect the other end of said first system of links to said cradle operating means, a second system of links to extend and contract said cradle operating means in an endwise direction, a second shaft in said frame forming a rocking axis for one end of said second system of links, said latter system of links being operatively connected adjacent its opposite end to said cradle operating means, a third shaft rotatably mounted in said framework, and means for operating both systems of links including a plurality of cams fixed upon said third shaft, said cradle operating means and guide means cooperating when both systems of links are rocked to constrain said cradle for movement effective to raise and turn an object on said supporting surface through a predetermined angle and to redeposit the same thereon in turned position.

13. An object turning device comprising a framework including an object supporting top surface, an object supporting cradle floatingly movable relative to said framework, means to mount said cradle for vertical, horizontal and pivotal movement relative to said supporting top surface including reversely operable cradle operating means to impart vertically and horizontally directed forces to said cradle and cooperating guide means on said framework and cradle to resolve the forces imparted to the latter, and means for driving said cradle operating means through predetermined cycles in reverse directions including a vertically reciprocable system of links and a horizontally reciprocable system of links, a reversely rotatable driven shaft and a series of cams on said shaft to operate said systems of links simultaneously when the shaft is rotated for imparting predetermined components of vertically and horizontally directed forces to said cradle, said guide means and cradle operating means cooperating when the latter is cyclically driven in reverse directions to turn the object on said supporting surface in reverse directions through a predetermined angle.

14. An object turning device comprising a framework including means forming an object supporting top surface, an object supporting cradle floatingly movable relative to said framework, means for imparting vertical and horizontal components of force to said cradle including rockably mounted longitudinally extensible and contractible operating means, reversely operable means for operating said operating means through predetermined cycles of rocking and longitudinal extension and contraction, cooperating cam and follower means effective to confine said cradle for movement over predetermined courses effective reversely to tilt an object on said top surface upon reverse operation of said operating means, and mechanism cyclically operated with the means for operating said operating means to jog said cradle at approximately that point in a cycle of the operating means at which the direction of the force or forces applied thereby to the cradle is reversed for counteracting the tendency of such reversal to interrupt the continued movement of the cradle over its course.

15. An object turning device comprising a framework including means forming a generally horizontally extending object supporting top surface having a plurality of parallel openings therein, a plurality of forks each having a pair of angularly related arms to adapt the forks for supporting rectangular shaped objects and means to support said forks for vertical, horizontal and rockable movement in planes vertically aligned with said openings including rigidly interconnected longitudinally extensible and contractible cradle operating means for each fork, means to mount said cradle operating means for rocking movement on a fixed axis adjacent one end thereof, means for pivotally connecting the free ends of said cradle operating means and said forks at an intermediate part of one of the arms of the latter, drive means for simultaneously effecting rocking movement and extension and contraction of said cradle operating means, means for operating said drive means through predetermined cycles, fixed face cams disposed in parallel spaced relation to said forks, and a follower adjacent the junction of the arms of each of said forks cooperating with said cams in synchronism to move the forks through a cycle effective angularly to change the position of the object on said supporting surface when said cradle operating means is driven through a cycle.

16. An object turning device comprising a framework supporting a generally horizontally extending stationary object support, an object receiving fork pivoted to swing in a vertical plane upon a pair of spaced vertically and horizontally movable axes, elongated fork operating means rockably mounted adjacent one of its ends in said frame and operatively connected adjacent its opposite end to one of the axes of said fork including members interconnected for relative endwise movement, cooperating drive means cyclically and substantially simultaneously to impart predetermined rocking movement to said fork operating means and to extend or contract the same so that horizontally and vertically directed components of force are exerted on the said one of said axes of said fork when the fork operating means is driven, and means for effecting movement of the other of said axes around a closed course when said one axis is subjected to horizontal and vertical components of force thereby to control movement of the fork including a cam disposed in vertical spaced relation to the fork and having a continuous closed camway formed therein and a follower at the second axis of said forks to engage in the camway.

17. An object turning device comprising a framework supporting a generally horizontally extending stationary object support, an object receiving fork pivoted to swing in a vertical plane upon a pair of spaced vertically and horizontally movable axes, elongated fork operating means rockably mounted adjacent one of its ends in said framework and operatively connected adjacent its opposite end to one of the axes of said fork including members interconnected for relative endwise movement, cooperating reversely operable drive means cyclically and substantially simultaneously to impart predetermined rocking movement to said operating means and to extend or contract the same so that horizontally and vertically directed components of force are exerted on the said one axes of said fork by said fork operating means in a direction dependent on the direction of operation of said reversely operable means, and means for effecting movement of the other of said axes around a closed course when said one axis is subjected to horizontal and vertical components of force in a direction dependent on the direction of application of the forces thereby to control movement of the fork including a vertically supported face cam disposed in spaced relation to said fork and having a continuous closed camway formed therein and a follower at the second axis of said fork to engage in the camway.

18. An object turning device comprising means forming an object support, a cradle adapted to receive a supported object, an elongated cradle operating means mounted adjacent one of its ends to rock upon a fixed axis and operatively connected adjacent its opposite end to said cradle including members operatively interconnected for relative endwise movement longitudinally to extend or contract said operating means, cooperating drive means cyclically and substantially simultaneously to apply predetermined rocking movement to said operating means as an entirety and relatively to move the said members through a predetermined cycle in an endwise direction for effecting the simultaneous application of angularly directed forces in the same plane to said cradle, means to constrain movement of said cradle to a predetermined course in response to the forces applied thereto, a motor for driving said drive means, and means to control operation of said motor including a manual control to initiate operation thereof at will and a control operable automatically to discontinue operation of the motor each time the cradle completes one cycle of operation over said predetermined course.

References Cited in the file of this patent

UNITED STATES PATENTS

| | | |
|---|---|---|
| 678,742 | Kennedy | July 16, 1901 |
| 1,191,920 | Koelkebeck | July 18, 1916 |

FOREIGN PATENTS

| | | |
|---|---|---|
| 187,989 | Germany | Aug. 5, 1907 |